US005340427A

United States Patent [19]

Cusack et al.

[11] Patent Number: 5,340,427

[45] Date of Patent: Aug. 23, 1994

[54] METHOD OF MAKING AN INDEX TAB LABEL ASSEMBLY

[75] Inventors: Joyce M. Cusack, Chicago, Ill.; Allison S. Phillips, Pasadena, Calif.; Anahit Tataryan, Temple City, Calif.; Astgik Sinanyan, North Hollywood, Calif.

[73] Assignee: Avery Dennison Corporation, Pasadena, Calif.

[21] Appl. No.: 874,067

[22] Filed: Apr. 24, 1992

Related U.S. Application Data

[63] Continuation-in-part of Ser. No. 668,991, Mar. 12, 1991, Pat. No. 5,135,261.

[51] Int. Cl.[5] .................... B32B 31/00

[52] U.S. Cl. .................... 156/268; 156/277; 156/278; 156/247

[58] Field of Search .................... 156/268, 277, 278, 247

[56] References Cited

U.S. PATENT DOCUMENTS

| | | | |
|---|---|---|---|
| Re. 32,490 | 10/1979 | Jenkins | 186/268 |
| 1,714,265 | 5/1929 | Gurwick | 156/277 |
| 2,425,043 | 8/1947 | Moore | 156/277 |
| 2,668,124 | 2/1954 | Mallabar | 156/277 |
| 2,797,801 | 7/1957 | Bishop | 156/268 |
| 2,876,575 | 3/1959 | Leika | 156/268 |
| 3,024,155 | 3/1962 | Huber | 156/277 |
| 3,413,171 | 11/1968 | Hannon | 156/277 |
| 3,425,145 | 2/1969 | Newton . | |
| 3,711,353 | 10/1970 | Zimmer | 156/277 |
| 3,733,212 | 5/1973 | McCafferty | 156/277 |
| 3,751,320 | 8/1973 | Buck | 156/268 |
| 3,860,473 | 1/1975 | Wesen | 156/268 |
| 3,950,200 | 4/1976 | Muramoto et al. | 156/277 |
| 4,255,480 | 3/1981 | Scher et al. | 156/277 |
| 4,328,057 | 5/1982 | Gutow | 156/268 |
| 4,359,358 | 11/1982 | Hattemer | 156/268 |
| 4,377,430 | 3/1983 | Bexley et al. | 156/268 |
| 4,398,985 | 8/1983 | Eagon | 156/277 |
| 4,568,403 | 2/1986 | Egan | 156/268 |
| 4,580,815 | 4/1986 | Barber . | |
| 4,594,125 | 6/1986 | Watson | 156/268 |
| 4,661,189 | 4/1987 | Voy et al. | 156/268 |
| 4,662,971 | 5/1987 | Adams | 156/277 |
| 4,763,930 | 8/1988 | Matney . | |
| 4,849,043 | 7/1989 | Instance | 156/277 |
| 4,872,706 | 10/1989 | Brewen et al. | 283/81 |
| 4,884,827 | 12/1989 | Kelley | 283/81 |
| 4,960,482 | 10/1990 | Crane et al. | 156/277 |
| 5,156,698 | 10/1992 | Roberts | 156/277 |

OTHER PUBLICATIONS

Catalog of Pifer Office Supply, Inc., 1988, pp. 225 and 243.

Catalog of Artistie Greetings, Inc., "The Personal Touch," Circa 1990, p. 33 Product of Day-Timers, Inc., 1991.

Product of Hyman Products, Inc., 1990.

*Primary Examiner*—Patrick J. Ryan
*Assistant Examiner*—M. Dixon
*Attorney, Agent, or Firm*—Poms, Smith, Lande & Rose

[57] ABSTRACT

A method of making an index tab label assembly using a label having a coating that facilitates printing on the label. Each label is made out of a polyester film having a pressure-sensitive adhesive attached to one side of the film and a coating comprising aluminum oxide, resin chips, methyl ethyl ketone, and toluene, applied to the other side of the sheet. The coating provides good anchorage for toner, abrasive resistance for writing, and electrostatic properties that facilitate printing when using laser or xerographic equipment. The labels are die cut from a thin sheet of film attached to a backing sheet by the pressure sensitive adhesive. Top, bottom and vertical strips of the thin sheet of film remain on the backing sheet after die cutting to facilitate passing the labels and backing sheet through a printing device, by preventing jamming as the assembly passes through the device. Indicia are printed on the labels by sending the labels and backing sheet through the printing device. One of the printed labels is then removed from the backing sheet and attached by the pressure sensitive adhesive directly to a tab of a divider or file to make an index tab, or to a tab reinforcer attached to the tab. The label may be transparent, and separate indicia may be printed on the label and/or tab of the divider. The tab may also be of different colors. Therefore, the indicia on the tab or color of the tab may be visible through the transparent label.

9 Claims, 3 Drawing Sheets

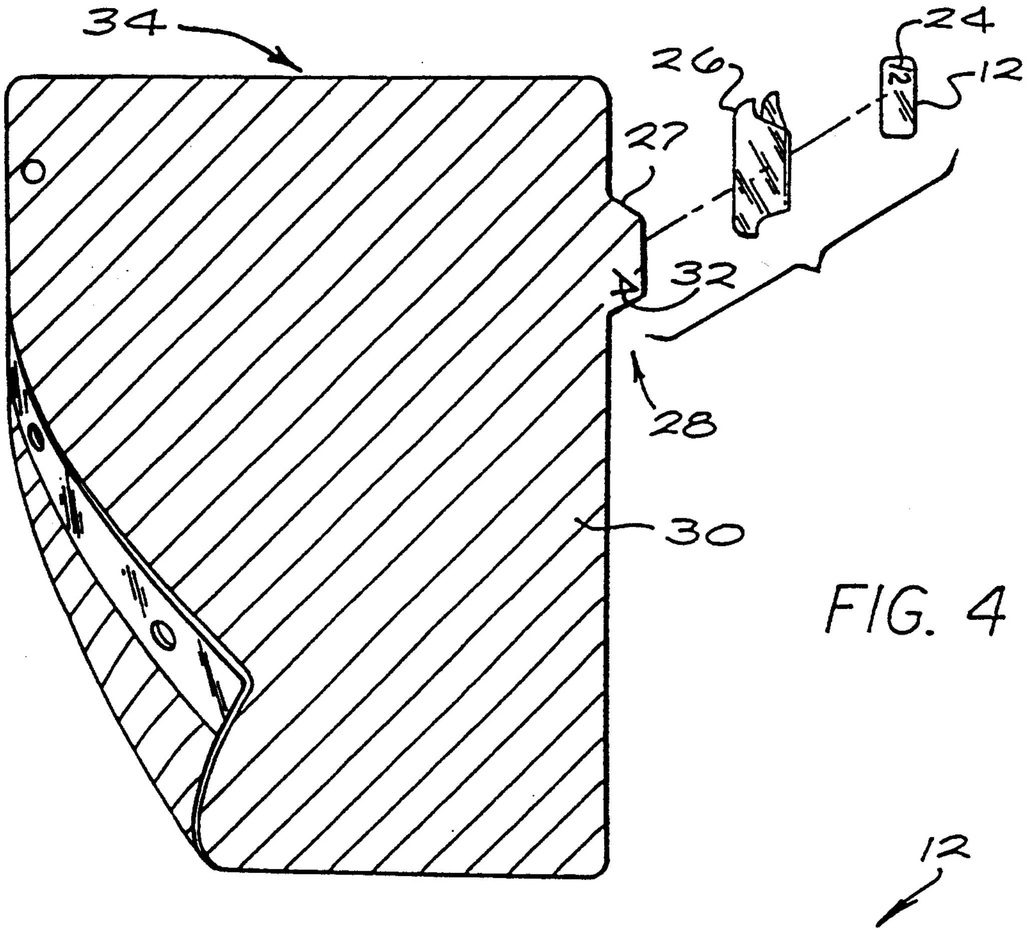
FIG. 4
FIG. 3
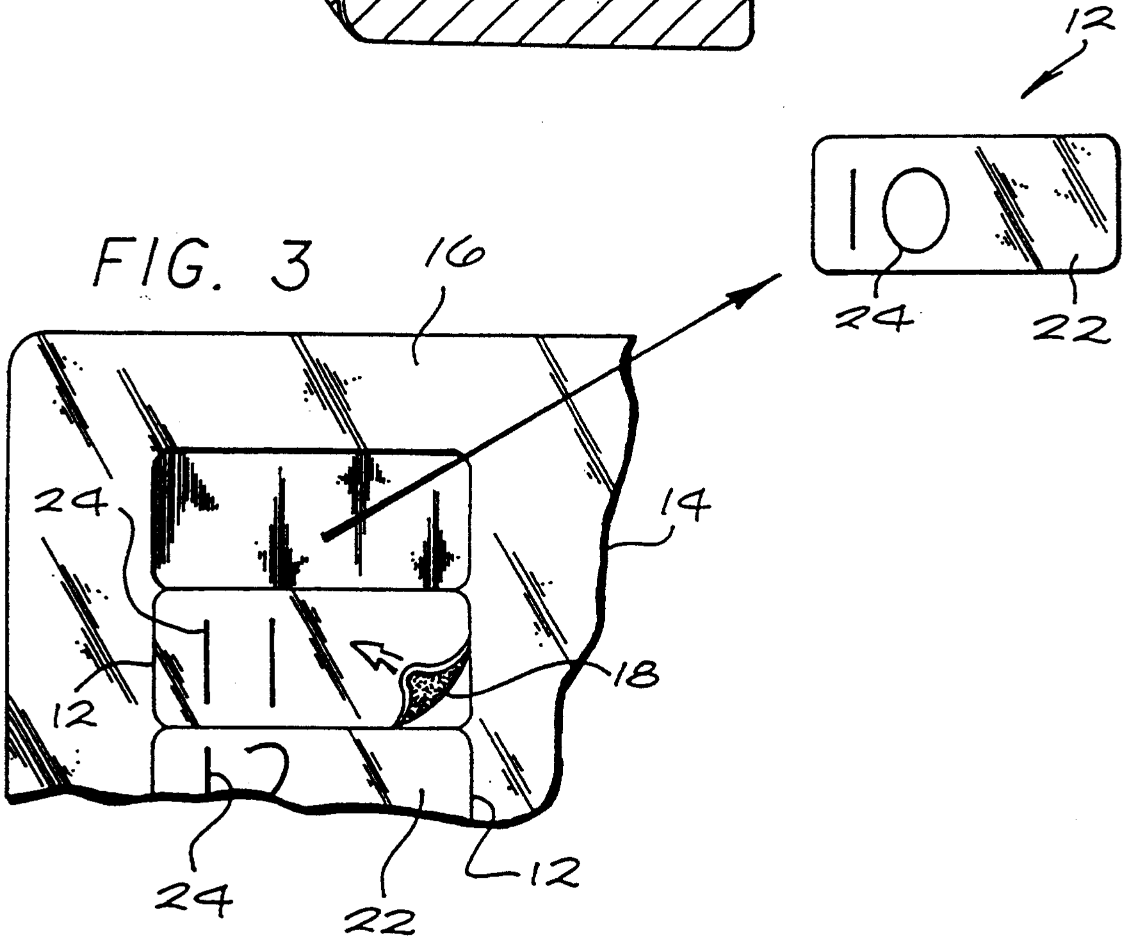

FIG. 5
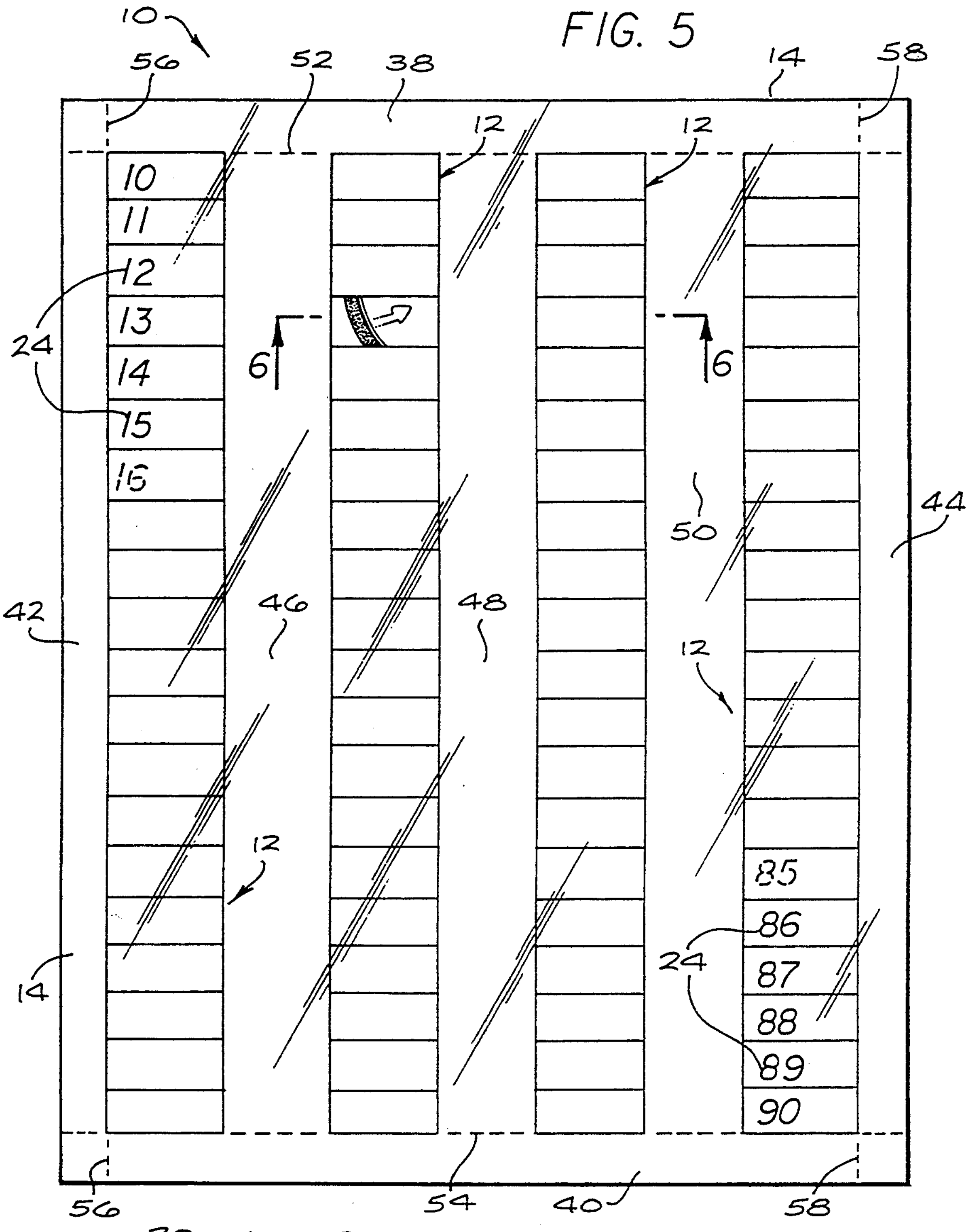
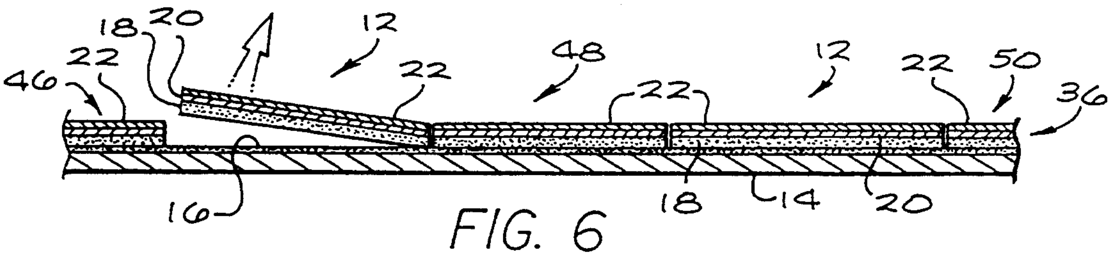
FIG. 6

METHOD OF MAKING AN INDEX TAB LABEL ASSEMBLY

CROSS-REFERENCE TO RELATED APPLICATION

The application is a continuation in part of copending application Ser. No. 07/668,991, filed Mar. 12, 1991, now U.S. Pat. No. 5,135,261, and entitled "INDEX TAB LABEL ASSEMBLY."

BACKGROUND OF THE INVENTION

The present invention relates generally to methods of making labels and index tabs used for notebooks, dividers, files, or the like, and more particularly to a method of making an index tab label assembly by die cutting labels from a thin sheet of film attached to a backing sheet by a pressure sensitive adhesive, printing indicia on the labels by sending the labels through a printing device, and applying the labels to index tabs.

FIELD OF THE INVENTION

In the past, labels have been used for a variety of different purposes. For example, U.S. Pat. No. 4,872,706, issued to Brewen et al. on Oct. 10, 1989, discloses a postage advertising label having a print side onto which an advertisement can be printed, and an adhesive side. A pressure sensitive adhesive may be used at the adhesive side to releasably secure the label to a backing member. The label is made out of a white opaque material. A postage stamp may be affixed to the print side of the label. Another label used on a bottle is described in U.S. Pat. No. 4,763,930, issued to Matney on Aug. 16, 1988. The label is precut from a clear cellulose acetate sheet. The back side of the label is first printed with a transparent light-colored material providing indicia, and then coated with a pressure sensitive adhesive. A white opaque material is printed on the front side of the label, and then overprinted with a black bar code.

U.S. Pat. No. 3,425,145, issued to Newton on Feb. 4, 1969, describes an index tab reinforced by a laminate consisting of Mylar and polyethylene layers of material. Indicia on the underlying tab may be seen through the transparent laminate materials. A composite strip for preparation of a substrate edge for the application of labels is disclosed in U.S. Pat. No. 4,580,815, issued to Barber on Apr. 8, 1986.

In the past, clear self-adhesive labels have been releasably attached to backing sheets. Transparent self-adhesive label protectors releasably attached to backing sheets are described on page 225 of the 1988 catalog of Pifer Office Supply, Inc.

SUMMARY OF THE INVENTION

One problem associated with the use of index dividers and file folder index tabs is that the index tabs are difficult to read and assemble, and often have a very poor appearance as well as a short lifetime under normal busy office usage conditions.

It is noted that laser printers have re-entrant printing paths and apply high levels of heat to the sheets being printed. These re-entrant sheet paths can cause jamming as the sheets are fed through the printer, and heated adhesive material on the sheets may ooze out of sheet assemblies and contaminate the printer.

Accordingly, one object of this invention is to form index tab label assemblies while avoiding these problems. There is a need for a method of making an index tab label assembly using a label that a person may easily print indicia on using laser or other printing equipment, and then use to make an index tab for a divider, file, or the like.

It is an object of this invention to provide a method of making an index tab label assembly using a label that a person may print indicia on using laser or other printing equipment.

It is another object of this invention to provide a method of making an index tab label assembly using a label that may be used to make an index tab for a divider, file, or the like.

It is still another object of this invention to provide an economical method of making an index tab label assembly.

These and other objects and advantages are attained in accordance with one specific illustrative method of making an index tab label assembly using a label having a coating that facilitates printing on the label. Each label is made out of a polyester film having a pressure sensitive adhesive attached to one side of the film and preferably a coating comprising aluminum oxide, PE 200 resin chips, methyl ethyl ketone, and toluene, applied to the other side of the sheet. The coating provides good anchorage for toner, abrasive resistance for writing, and electrostatic properties that facilitate printing when using laser or xerographic equipment. The labels are die cut from a thin sheet of film attached to a backing sheet by the pressure sensitive adhesive. Top, bottom and vertical strips of the thin sheet of film remain on the backing sheet after die cutting to facilitate passing the labels and backing sheet through a printing device, by preventing jamming as the assembly passes through the device. Indicia are printed on the labels by sending the labels and backing sheet through the printing device. One of the printed labels is then removed from the backing sheet and attached by the pressure sensitive adhesive directly to a tab of a divider or file to make an index tab, or to a tab reinforcer attached to the tab.

In accordance with a broader aspect of the invention, a method of making an index tab label assembly is provided using a label with a coating that facilitates printing indicia on the label. Each label is made out of a thin film having the coating applied to one side and an adhesive applied to the other side. The labels are die cut from a thin sheet of film attached to a backing sheet by the pressure sensitive adhesive. Top, bottom and vertical strips of the thin sheet of film remain on the backing sheet after die cutting. The index tab label assembly is formed by attaching the label to a tab of a divider or a file using the adhesive. The label may be transparent, and separate indicia may be printed on the label and/or on the tab of the divider. The tab may also be of different colors. Therefore, the indicia on the tab or color of the tab may be visible through the transparent label.

The various features of the present invention will be best understood together with further objects and advantages by reference to the following description of the preferred embodiments taken in conjunction with the accompanying drawings.

BRIEF DESCRIPTION OF THE DRAWINGS

FIG. 3 is an enlarged detailed view of some of the labels of FIG. 1 showing one of the labels removed from the backing sheet;

FIG. 4 is a front elevational view of an index tab label assembly showing how one of the labels of FIG. 1 may be used with a tab reinforcer to make an index tab (label and reinforcer shown in exploded view);

FIG. 5 is a front elevational view of another embodiment having a plurality of labels die cut from a thin sheet of film releasably attached to the backing sheet; and FIG. 6 is a cross-sectional view taken in the direction of arrows 6—6 shown in FIG. 5.

DESCRIPTION OF THE PREFERRED EMBODIMENTS

The following specification taken in conjunction with the drawings sets forth the preferred embodiments of the present invention in such a manner that any person skilled in the art can make and use the invention. The embodiments of the invention disclosed herein are the best modes contemplated by the inventors for carrying out their invention in a commercial environment, although it should be understood that various modifications can be accomplished within the parameters of the present invention.

Figure 1:
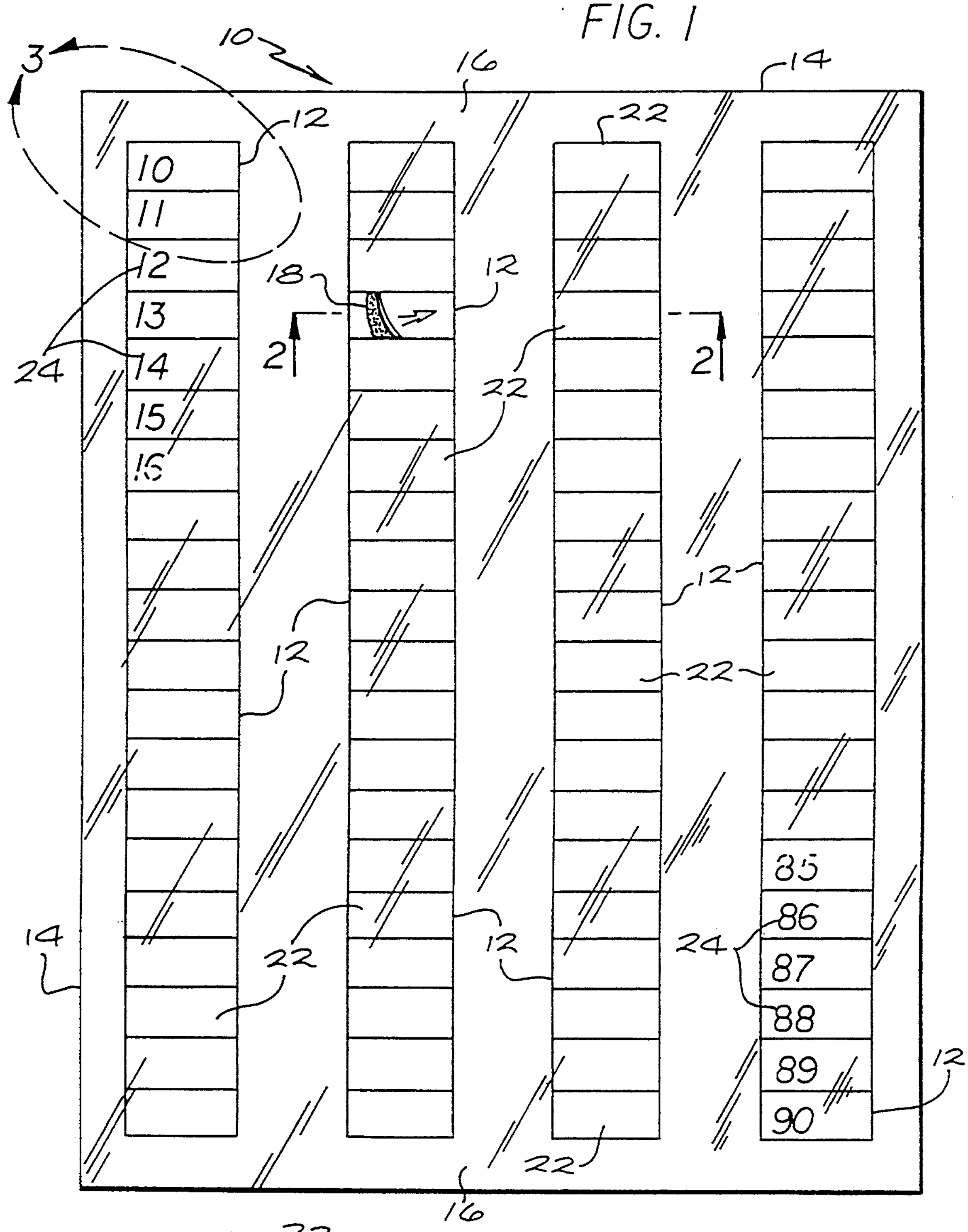
FIG. 1 is a front elevational view showing a plurality of labels releasably attached to a backing sheet.
Figure 2:
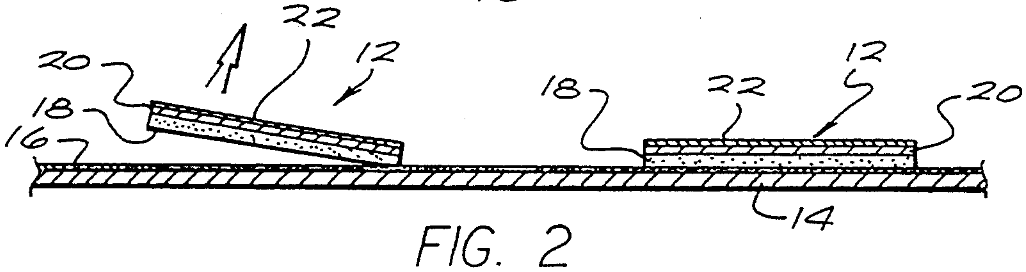
FIG. 2 is a cross-sectional view taken in the direction of arrows 2—2 shown in FIG. 1.

FIGS. 1 through 3 show a label product 10 having a plurality of labels 12 releasably attached to a backing sheet 14. The backing sheet 14 is preferably made out of 03870-45#MF bleached paper sold by James River Corporation. However, any paper, plastic, or other material may be used for sheet 14. The sheet 14 and labels 12 may be easily sent through laser or other printing equipment.

The backing sheet 14 preferably has a silicone release coating 16 on one side thereof that facilitates peeling labels 12 off the sheet 14 as discussed below. Alternatively, fluorinated or amine-based release coatings 16 may be used, or any other desirable coating 16. The release coating 16 is preferably formed of conventional silicone material which has a negligible thickness in the order of a few ten-thousandths of an inch.

The plurality of labels 12 are releasably attached to backing sheet 14 by a stable, pressure sensitive adhesive 18 of a type which will not flow at a temperature of a few hundred degrees Fahrenheit. However, it is preferred that the pressure sensitive adhesive 18 will remain stable when subjected to temperatures in the range of up to about 300 to about 400 degrees Fahrenheit to facilitate printing on the labels 12 through laser or other high temperature printing equipment as discussed below.

The adhesive 18 may be PO9 acrylic adhesive sold by Avery Dennis Corporation, or a rubber based adhesive of styrene butadiene and ABA block copolymers compounded with tackifying resins. However, it is important to note that any suitable stable, pressure sensitive adhesive 18 may be used which facilitates printing at high temperatures, peeling from the backing sheet 14, and adhering the labels 12 to an index tab as discussed below.

As best shown in FIG. 2, each label 12 has a film 20 with a thickness preferably in a range of from about 1.42 mils to about 3.0 mils. However, any desirable thickness may be used for the film 20. The film 20 is preferably transparent and made from 142 gauge matte-finish Hostaphan 2000 series film marketed by Hoechst Celanese.

However, any desirable polyester may be used for the film 20 such as Mylar, or the like.

The adhesive 18 is attached to one side of each film 20 (used for each label 12), and a coating 22 is applied to the other side of the film 20. The coating 22 is used to facilitate printing on the label 12 (or film 20) using laser or other printing techniques (such as xerographic printing). As such, the coating 22 provides good anchorage for toner and abrasive resistance for writing on the labels 12.

The coating 22 preferably comprises aluminum oxide ($Al_2O_3$), PE 200 resin chips sold by Goodyear, methyl ethyl ketone, and toluene. By weight, this composition preferably comprises aluminum (oxide 14.3 parts), PE 200 resin chips (18.7 parts), methyl ethyl ketone (33.5 parts), and toluene (33.5 parts). However, the composition by weight of the coating 22 may be varied as desired. The resin chips dissolve and the aluminum oxide disperses in the methyl ethyl ketone, resulting in a very dispersed aluminum oxide and a coating 22 that is transparent and provides a milky tone, or a white background for printing. The thickness of the coating 22 preferably has a range of from about 0.01 mil to about 0.03 mil. However, any desirable thickness may be used for the coating 22. It is important to note that the coating 22 gives the polyester film 20 desirable electrostatic properties. Such properties facilitate printing on the labels 12 by laser or electrostatic printing.

The labels 12 may be releasably attached to the backing sheet 14 in rows as shown in FIG. 1. When so configured, the label product 10 may be easily fed through laser or other printing equipment so that indicia 24 such as numbers, letters, designs, or the like may be printed on the labels 12. The labels 12 may then be peeled off the backing sheet 14 and used in a variety of different ways.

FIG. 4 shows how one of the labels 12 may be used with a tab reinforcer 26 to make an index tab 28 on a sheet 30 of an index tab label assembly. The sheet 30 may be made out of any type of paper, plastic material, or other suitable matter.

After indicia 24 is printed on the label 12, it may be easily peeled from the backing sheet 14 due to the release coating 16. The label 12 may then be attached to the tab reinforcer 26 using the pressure sensitive adhesive 18. The tab reinforcer 26 is then attached to a tab 27 of the divider sheet 30 using any suitable means such as adhesive, or the like, forming index tab 28. As discussed above, label 12 is preferably transparent. If tab reinforcer 26 is also made out of a transparent material such as plastic, then indicia 32 on tab 27 can be seen through label 12 and reinforcer 26 so that indicia 24 and 32 may be used together for the purpose of marking or identifying index tab 28. Moreover, if tab 27 is colored, then the color of tab 27 will be visible through label 12 and reinforcer 26 and may be used with indicia 24 and 32 to further identify tab 28.

Alternatively, one of the labels 12 may be attached by the pressure sensitive adhesive 18 directly to tab 27 in order to make the index tab 28. This eliminates the need for the tab reinforcer 26, resulting in a more economical assembly 34. However, if a reinforced index tab 28 is desired, then the tab reinforcer 26 should be used as described above. The index tab 28 may be used for notebooks, dividers, files, or the like.

It is important to note that the pressure sensitive adhesive 18 may be chosen to allow the label 12 to be peeled off the tab 27, or tab reinforcer 26, and replaced with another label 12, if desired. However, adhesive 18 will keep the label 12 permanently attached to the tab 27 or tab reinforcer 26, if a new label is not needed.

The label product 10 is shown in FIGS. 5 and 6 at a stage in the manufacturing process with a complete film sheet 36 in place. A plurality of labels 12 are die cut, or otherwise formed or cut, from the sheet 36 of film 20 having an adhesive 18 and coating 22, as described above. The sheet 36 is releasably held by adhesive 18 to the backing sheet 14 which has the release coating 16 described above. Preferably, the labels 12 are cut from sheet 36 after sheet 36 is applied to the backing sheet 14.

As shown in FIGS. 5 and 6, a top strip 38, bottom strip 40, side or vertical strips 42 and 44, and vertical strips 46 through 50 are formed when the labels 12 are cut from sheet 36. Strips 38 through 50 include strips of film 20 with the coating 22 applied thereto. Adhesive 18 releasably holds the strips 38 through 50 to the backing sheet 14. As such, strips 38 through 50 provide a label product 10 of uniform thickness, which facilitates passing the label product 10 through a printing device such as a laser printer, or a copier such as a xerographic copier, for the purpose of printing indicia 24 on the labels 12. It is noted in passing that the sheets of the present invention are fully flexible so that they do not jam when feeding through the re-entrant paths of such printing devices; and the high temperature adhesive avoids contamination of the printers and copiers.

Following printing of the labels, the material other than the labels may be removed, giving the upper label layer including the strips of labels as shown in FIG. 1. Lines of perforations 52 through 58 may be used in sheet 36 as shown in FIG. 5 to facilitate removing strips 38 through 50.

After indicia 24 are printed on the labels 12, one of the labels 12 may be peeled off the backing sheet 14 and used, with or without the tab reinforcer 26 of FIG. 4, to make the index tab 28 shown in FIG. 4, as described above. Any number of columns of labels 12 or strips 38 through 50 may be used for the label product 10, and any or all of the strips 38 through 50 may be used. For example, the product 10 may be made without side strips 42 and 44, if desired. Also, the strips 38 through 50 and labels 12 may vary in size, if desired. For example, the label product 10 may be made with two columns of short labels 12 and two columns of long labels 12, if desired.

The above description discloses the preferred embodiments of the present invention. However, persons of ordinary skill in the art are capable of numerous modifications once taught these principles. For instance, by way of example and not limitation, different sizes or shapes of labels 12 may be used. In addition, the tab reinforcer 26 or the film 20 used for the labels 12 may be opaque rather than transparent.

It is further noted that the upper transparent sheet 20 may be formed of a transparent paper, such as Azon Premium Bond which directly accepts either electrostatic printing from a laser printer, for example, or ink jet printing. Also, instead of the specific coating mentioned above, a coating identified as Polaqua 1000, available from ADM Tronics Unlimited, may be employed, or any other suitable coating may be used. Accordingly, it will be understood by those skilled in the art that changes in form and details may be made to the above-described embodiments without departing from the spirit and scope of the invention.

We claim:

1. A method for labelling file folder tabs, comprising the steps of:

forming a fully flexible sheet having two layers including a backing sheet layer which has a release coating thereon, and a transparent upper label sheet layer, said upper layer having a top coating to facilitate printing on the upper surface thereof and a pressure sensitive adhesive on the lower surface thereof facing the backing sheet, said pressure sensitive adhesive being stable in the presence of temperatures up to 200 degrees Fahrenheit;

die cutting a plurality of labels and strips in the upper label sheet layer so that the upper layer is substantially continuous around the edges thereof;

said step of die cutting a plurality of labels and strips including cutting the labels into a pattern of columns and rows;

cutting perforations in said upper layer for facilitating removal of said strips;

printing indicia onto the labels by feeding the sheet through a printing device, with the continuous edges and flexibility of the sheet preventing jamming of the printing device and the temperature stability of the adhesive avoiding contamination of the printing device;

said printing being accomplished by sending said thin film labels and backing sheet selectively through laser and electrostatic printers;

providing an index divider having an integral outwardly extending tab, said tab having unique identification thereon; and applying one of the printed labels to the tab;

whereby the assembled index divider and transparent label may have visible identification from both the printed label and from the unique identification on the tab.

2. A method for labelling file folder tabs, comprising the steps of:

forming a fully flexible sheet having two layers including a backing sheet layer which has a release coating thereon, and a transparent upper label sheet layer, said upper layer having a top coating to facilitate printing on the upper surface thereof and a pressure sensitive adhesive on the lower surface thereof facing the backing sheet, said pressure sensitive adhesive being stable in the presence of temperatures up to 200 degrees Fahrenheit;

die cutting a plurality of labels and strips in the upper label sheet layer so that the upper layer is substantially continuous along at least one edge thereof;

said step of die cutting a plurality of labels and strips including cutting the labels into a pattern of columns and rows;

printing indicia onto the labels by feeding the sheet through a printing device, with the continuous edges and flexibility of the sheet preventing jamming of the printing device and the temperature stability of the adhesive avoiding contamination of the printing device;

said printing being accomplished by sending said thin film labels and backing sheet selectively through said printing devices;

providing an index divider having an integral outwardly extending tab; and applying one of the printed labels to the tab;

whereby the assembled index divider and transparent label may have visible identification from both the printed label and from the unique identification on the tab.

3. The method of claim 2 further comprising the step of reinforcing the tab of the index divider.

4. The method of claim 2 wherein the forming step includes preparation of a top coating on the upper layer which provides anchorage for printing material, desirable electrostatic properties to facilitate laser and electrostatic printing, abrasive resistance for writing, and a background for enhancing the indicia printed on the label.

5. The method of claim 2 wherein the top coating comprises aluminum oxide, resin, methyl ethyl ketone and toluene.

6. The method of making an index tab label assembly of claim 2 wherein said thin film sheet comprises polyester.

7. The method of making an index tab label assembly of claim 2 wherein said printing step includes laser printing.

8. The method of making an index tab label assembly of claim 2 wherein said printing strip includes electrostatic printing.

9. The method of making an index tab label assembly of claim 2 wherein said die cutting step includes forming top, bottom and side strips which extend peripherally around said thin film sheet.

* * * * *